US006764123B1

(12) United States Patent
Bilyard

(10) Patent No.: US 6,764,123 B1
(45) Date of Patent: Jul. 20, 2004

(54) FOLDING TAILGATE EXTENSION

(76) Inventor: David G. Bilyard, 1768 Indian Trail Rd., Harrisonburg, VA (US) 22802

( * ) Notice: Subject to any disclaimer, the term of this patent is extended or adjusted under 35 U.S.C. 154(b) by 0 days.

(21) Appl. No.: 10/621,204

(22) Filed: Jul. 16, 2003

(51) Int. Cl.[7] .............................................. B62D 33/03
(52) U.S. Cl. ......................................... 296/61; 296/62
(58) Field of Search ...................... 296/61, 62; 414/537; 14/71.1; 182/95, 96

(56) References Cited

U.S. PATENT DOCUMENTS

| 560,752 | A | * | 5/1896 | Prator | 296/62 |
|---|---|---|---|---|---|
| 3,288,522 | A | * | 11/1966 | Norton | 296/61 |
| 3,352,440 | A | * | 11/1967 | Wilson | 296/61 |
| 3,713,553 | A | * | 1/1973 | Curtis et al. | 296/61 |
| 6,120,081 | A | * | 9/2000 | Collins | 296/61 |
| 6,378,927 | B1 | * | 4/2002 | Parry-Jones et al. | 296/61 |
| 6,447,040 | B1 | * | 9/2002 | Young, Sr. | 296/61 |
| 6,527,326 | B2 | * | 3/2003 | Henderson | 296/61 |
| 2003/0127873 | A1 | * | 7/2003 | Reed | 296/26.08 |

* cited by examiner

Primary Examiner—Jason Morrow

(57) ABSTRACT

The Folding Tailgate Extension of the present invention is designed to provide a convenient and compact means to aid in loading and unloading pickup trucks. To attain this, the present invention essentially comprises a folding ramp assembly installed along the outer edge of an existing pickup truck tailgate that can extend downward to the ground behind the lowered tailgate. The Folding Tailgate Extension can be used as either a ramp or a step, and is easily folded and concealed inside of a pickup truck tailgate when not in use.

4 Claims, 3 Drawing Sheets

FOLDING TAILGATE EXTENSION

BACKGROUND OF THE INVENTION

1. Field of the Invention

The present invention relates to a Folding Tailgate Extension for use in connection with loading pickup trucks. The Folding Tailgate Extension has particular utility in connection with providing an easy to use, space saving means of loading and unloading wheeled vehicles or heavy equipment from pickup trucks.

2. Description of the Prior Art

Folding Tailgate Extensions are desirable for loading and unloading wheeled vehicles or heavy equipment from pickup trucks.

The use of pickup truck tailgate extensions or ramps is known in the prior art. For example, U.S. Pat. No. 3,642,156 to Stenson discloses a pickup truck loading ramp. However, the structure of the Stenson '156 patent is different from that of the present invention, and has the further drawback of being constructed from rails and crossbars, thereby not providing a solid surface.

U.S. Pat. No. 2,797,960 to Endres, et al. discloses a vehicle tailgate that is capable of forming a ramp. However, the Endres, et al. '960 patent is also structurally different from and does not provide the configuration options of the present invention.

Similarly, U.S. Pat. No. 5,988,725 to Cole discloses a foldable tailgate ramp for pickup trucks. However, the Cole '725 patent is not as compact as the present invention, and, like the Stenson '156 patent, does not provide a solid surface.

Lastly, U.S. Pat. Nos. 5,540,474 to Holland, 4,735,454 to Bernard, and Des. 382,676 to Holbrook disclose folding ramps for pickup trucks that are indicative of the current state of the art.

While the above-described devices fulfill their respective, particular objectives and requirements, the aforementioned patents do not describe a Folding Tailgate Extension that incorporates the convenience, versatility, safety, and collapsible design of the present invention. Therefore, a need exists for a new and improved Folding Tailgate Extension that eliminates heavy lifting, improves safety, saves space, and provides added convenience. In this regard, the present invention substantially fulfills this need. In this respect, the Folding Tailgate Extension according to the present invention substantially departs from the conventional concepts and designs of the prior art, and in doing so provides an apparatus primarily developed for the purpose of loading and unloading wheeled or heavy equipment from a pickup truck.

SUMMARY OF THE INVENTION

In view of the foregoing disadvantages inherent in the known types of pickup truck tailgate extensions and ramps now present in the prior art, the present invention provides an improved Folding Tailgate Extension, and overcomes the above-mentioned disadvantages and drawbacks of the prior art. As such, the general purpose of the present invention, which will be described subsequently in greater detail, is to provide a new and improved Folding Tailgate Extension which has all the advantages of the prior art mentioned heretofore and many novel features that result in a Folding Tailgate Extension which is not anticipated, rendered obvious, suggested, or even implied by the prior art, either alone or in any combination thereof.

To attain this, the present invention essentially comprises a folding ramp assembly installed along the outer edge of an existing pickup truck tailgate. The Folding Tailgate Extension of the present invention further comprises at least three equal-sized solid panels that can fold up for compact storage against the inside of the raised tailgate or extend downward to the ground behind the lowered tailgate. The panels are hingedly connected with each other, as well as with the tailgate of the truck.

To load wheeled equipment into the bed of the pickup truck, the tailgate is lowered, and the hinged panels are locked into a rigid planar configuration, providing a strong, stable ramp upon which to drive or push the wheeled equipment into the bed.

In an alternate configuration, the hinged panels can be locked orthogonal to each other, forming a step to facilitate the loading and unloading of heavy or awkwardly sized equipment.

Once the equipment is loaded, the Folding Tailgate Extension can be unlocked and folded accordion style, and secured to the inner wall of the original tailgate. The tailgate is then returned to its upright position, thereby concealing the folded extension.

The present invention may be made of strong plastic, wood, a light metal, such as aluminum, or a combination thereof. The Folding Tailgate Extension may also be colored to match the color of the pickup truck, and could be offered as original equipment on new pickup trucks, or as an aftermarket add on. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Folding Tailgate Extension that has all of the advantages of the prior art pickup truck ramps and none of the disadvantages.

It is another object of the present invention to provide a new and improved Folding Tailgate Extension that may be easily and efficiently manufactured and marketed.

An even further object of the present invention is to provide a new and improved Folding Tailgate Extension that has a low cost of manufacture with regard to both materials and labor, and which accordingly is then susceptible of low prices of sale to the consuming public, thereby making such Folding Tailgate Extension economically available to the buying public.

Still another object of the present invention is to provide a new Folding Tailgate Extension that provides in the apparatuses and methods of the prior art some of the advantages thereof, while simultaneously overcoming some of the disadvantages normally associated therewith.

Lastly, it is an object of the present invention to provide a Folding Tailgate Extension that enables wheeled or heavy equipment to be easily moved in or out of a pickup truck bed, while eliminating heavy lifting, improving safety, saving space, and providing added convenience.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
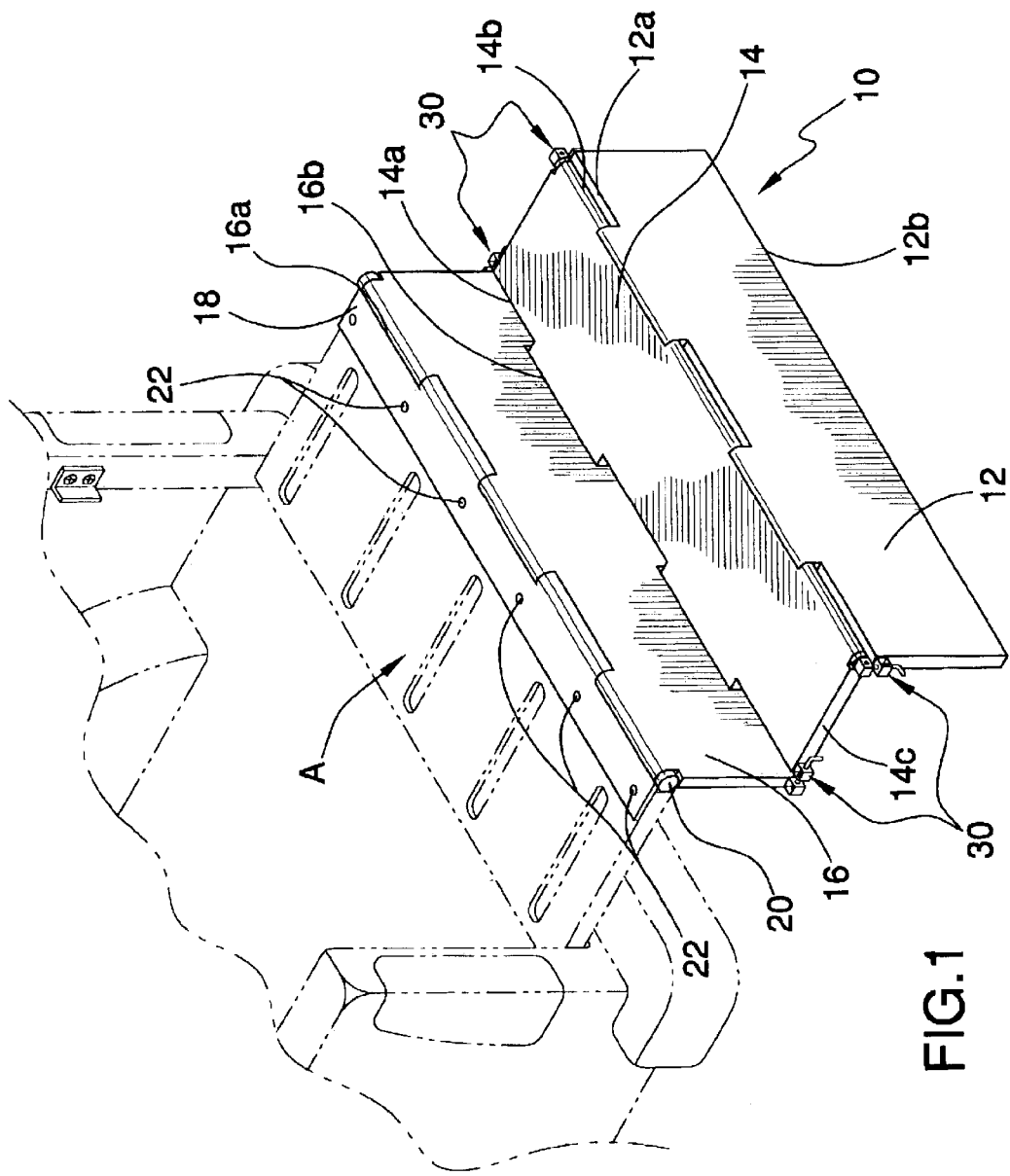
FIG. 1 is a perspective view of the preferred embodiment of the Folding Tailgate Extension constructed in accordance with the principles of the present invention, shown in the step configuration.
Figure 2:
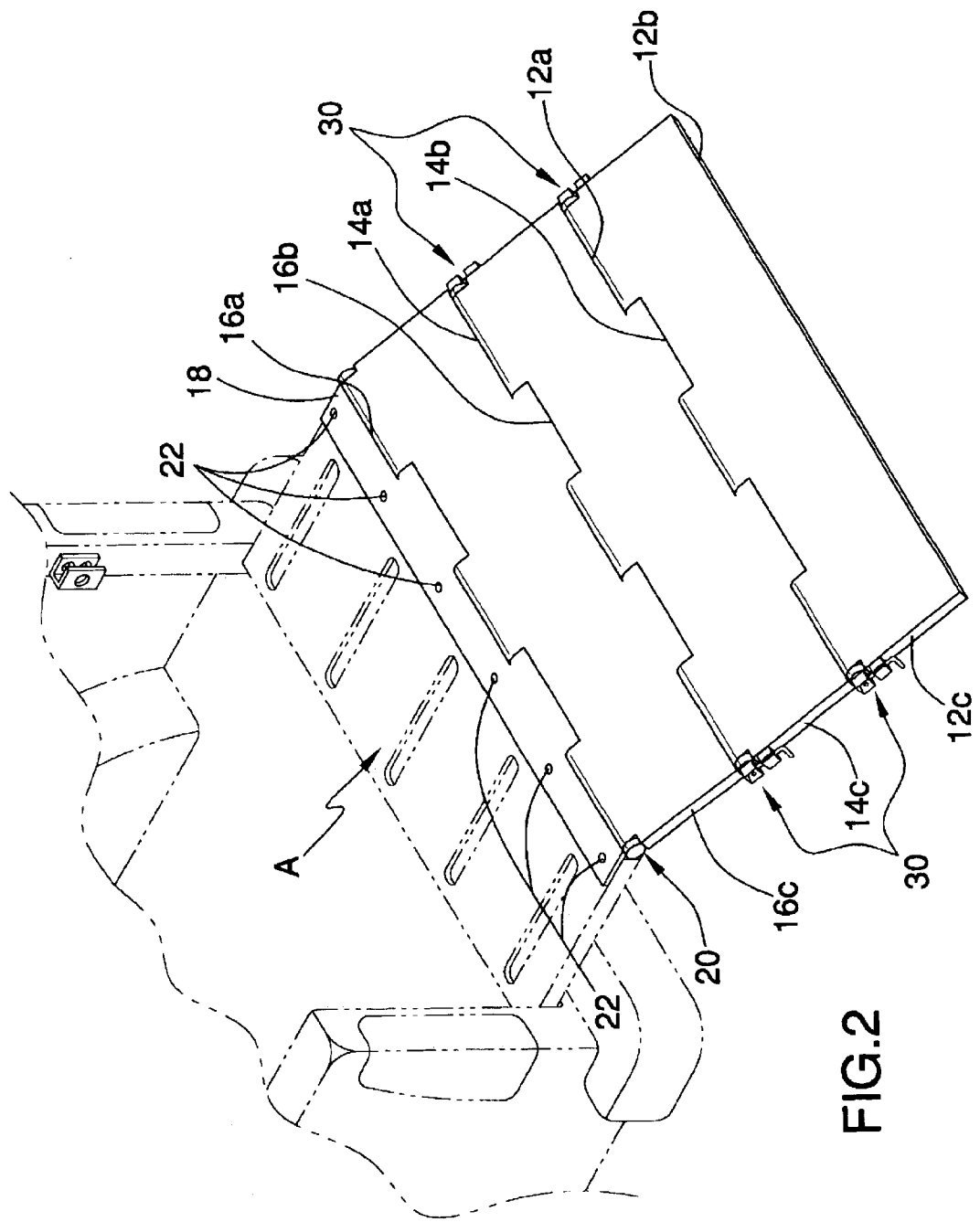
FIG. 2 is a perspective view of the Folding Tailgate Extension of the present invention, shown in the ramp configuration.
Figure 3:
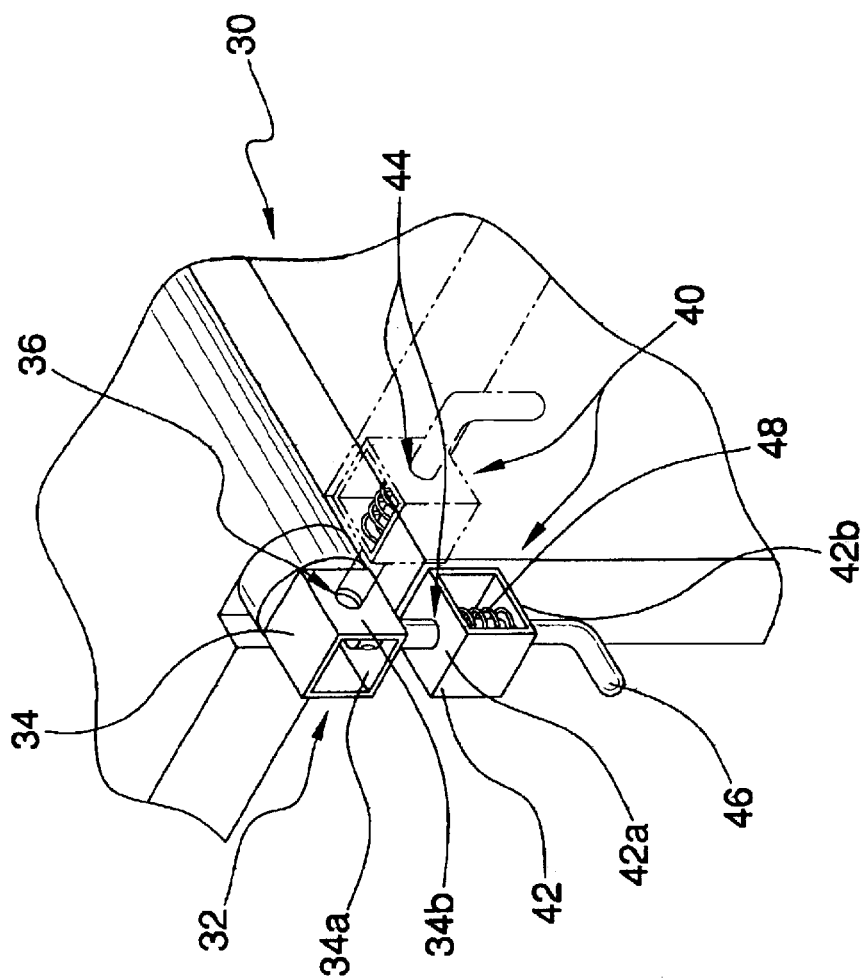
FIG. 3 is a perspective view of the locking mechanism of the Folding Tailgate Extension of the present invention.

Referring now to the drawings, and particularly to FIGS. 1–3, a preferred embodiment of the Folding Tailgate Extension of the present invention is shown and generally designated by the reference numeral 10.

In FIG. 1, a new and improved Folding Tailgate Extension 10 of the present invention for loading and unloading a pickup truck is illustrated and will be described. The Folding Tailgate Extension 10 comprises three essentially rectangular panels 12, 14, 16 connected to each other by hinges 20, and to a pickup truck tailgate A by mounting bracket 18. More particularly, each panel 12, 14, 16 has an upper longitudinal edge 12a, 14a, 16a and a lower longitudinal edge 12b, 14b, 16b. Panel 12 has a free lower edge 12b, with its upper edge being hingedly attached to the lower edge 14b of panel 14. Likewise, panel 14 has a lower edge 14b hingedly attached to panel 12, and an upper edge 14a hingedly attached to panel 16. The lower edge 16b of panel 16 is hingedly attached to panel 14, and the upper edge 16a of panel 16 is hingedly attached to mounting bracket 18. Mounting bracket 18 is attached to a pickup truck tailgate A by fasteners 22.

Panels 12, 14, 16 further comprise transverse edges 12c, 14c, 16c. Locking means 30 is mounted to the transverse edges 12c at each end of the upper edge 12a of panel 12, at each end of the upper edge 14a and lower edge 14b of panel 14, and at each end of the lower edge 16b of panel 16. Locking means 30 is capable of configuring panels 12, 14, 16 in an orthogonal relationship to form a step.

Similarly, FIG. 2, illustrates the Folding Tailgate Extension 10, comprising three essentially rectangular panels 12, 14, 16 connected to each other by hinges 20, and to a pickup truck tailgate A by mounting bracket 18. Each panel 12, 14, 16 has an upper longitudinal edge 12a, 14a, 16a and a lower longitudinal edge 12b, 14b, 16b. Panel 12 has a free lower edge 12b, with its upper edge being hingedly attached to the lower edge 14b of panel 14. Likewise, panel 14 has a lower edge 14b hingedly attached to panel 12, and an upper edge 14a hingedly attached to panel 16. The lower edge 16b of panel 16 is hingedly attached to panel 14, and the upper edge 16a of panel 16 is hingedly attached to mounting bracket 18. Mounting bracket 18 is attached to a pickup truck tailgate A by fasteners 22. Panels 12, 14, 16 further comprise transverse edges 12c, 14c, 16c. Locking means 30 is mounted to the transverse edges 12c at each end of the upper edge 12a of panel 12, at each end of the upper edge 14a and lower edge 14b of panel 14, and at each end of the lower edge 16b of panel 16. Locking means 30 is capable of configuring panels 12, 14, 16 in a planar relationship to form a ramp.

FIG. 3 illustrates the details of locking means 30. Locking means 30 comprises a receiver 32 and pin assembly 40. Receiver 32 comprises an open block 34 with holes 36 in adjacent sides 34a, 34b. Pin assembly 40 comprises an open block 42 with holes 44 in opposing sides 42a, 42b. Pin 46 extends through holes 44 and is secured in place by spring 48. Panels 12. 14, 16 are locked into position by inserting pin 46 into one of receiver holes 36.

Referring now to FIGS. 1–3, pin assemblies 40 are mounted to the transverse edges 12c, 14c such that holes 44 and pin 46 are aligned with the transverse edges 12c, 14c of the panels 12, 14. Receivers 32 are mounted to the transverse edges 14c, 16c such that at least one of hole 36 is aligned with the transverse edges 14c, 16c and one hole 36 is orthogonal to the transverse edges 14c, 16c of the panels 14, 16.

In use, it can now be understood that the Folding Tailgate Extension of the current invention can be configured to form a step, as illustrated in FIG. 1, by locking the panels 12, 14, 16 orthogonal to each other. Alternatively, the Folding Tailgate Extension of the present invention is easily configured to form a ramp by locking panels 12, 14, 16 in a planar arrangement, as illustrated by FIG. 2.

While a preferred embodiment of the Folding Tailgate Extension has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a variety of wood may be used. Also, the locking means may be a simple removable pin design, instead of the spring loaded pin assembly of the preferred embodiment. And although loading and unloading heavy or wheeled equipment has been described, it should be appreciated that the Folding Tailgate Extension herein described is also suitable for any purpose where a strong, stable ramp or step is desired.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A folding tailgate extension comprising a plurality of rectangular panels, wherein the longitudinal edges of said panels are hingedly attached to each other in series and said panels comprise locking means; wherein said locking means comprise a receiver and a pin assembly, such that:

said receiver further comprises a block fixedly attached to the transverse edge of a first of said panels, said block having holes located in adjacent sides, at least one of said holes being aligned with the transverse edge of said panel, and at least one of said holes being orthogonal to the transverse edge of said panel;

said pin assembly further comprises a block fixedly attached to the transverse edge of a second of said panels, said block having holes located in opposite sides, said holes being aligned with the transverse edge of said panel, and a pin extending through said holes, slideably attached by a spring inside of said block;

said pin is able to engage said transverse holes in said receiver so that said first and second panels form a plane; and, said pin is alternatively able to engage said orthogonal holes in said receiver so that said first and second panels form a right angle.

2. The folding tailgate extension of claim 1, wherein said panels are plastic.

3. The folding tailgate extension of claim 1, wherein said panels are metal.

4. The folding tailgate extension of claim 1, wherein said panels are wooden.

* * * * *